(No Model.) 3 Sheets—Sheet 1.
A. A. KENT.
LAWN SPRINKLER.
No. 423,778. Patented Mar. 18, 1890.
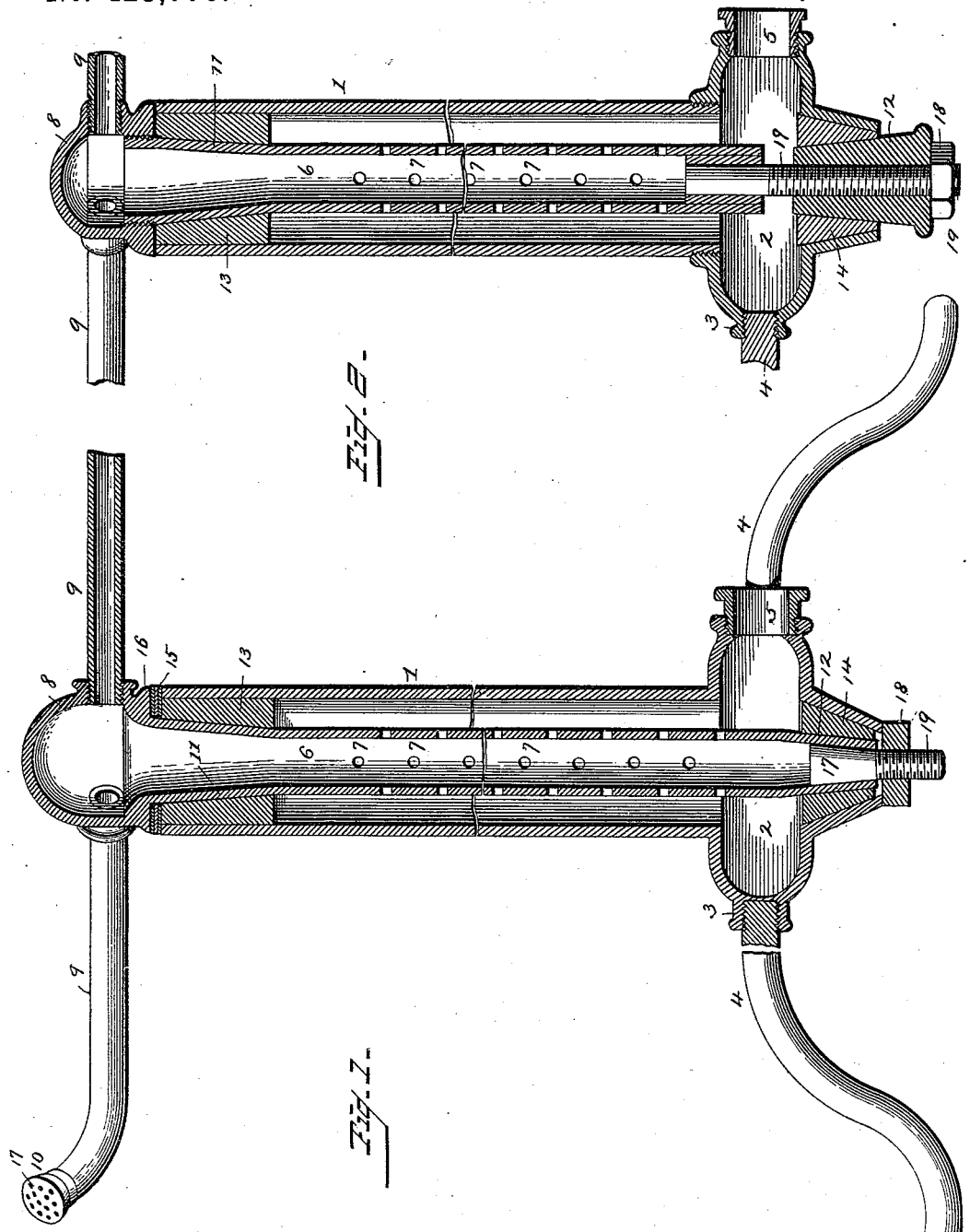

(No Model.) 3 Sheets—Sheet 2.
A. A. KENT.
LAWN SPRINKLER.
No. 423,778. Patented Mar. 18, 1890.
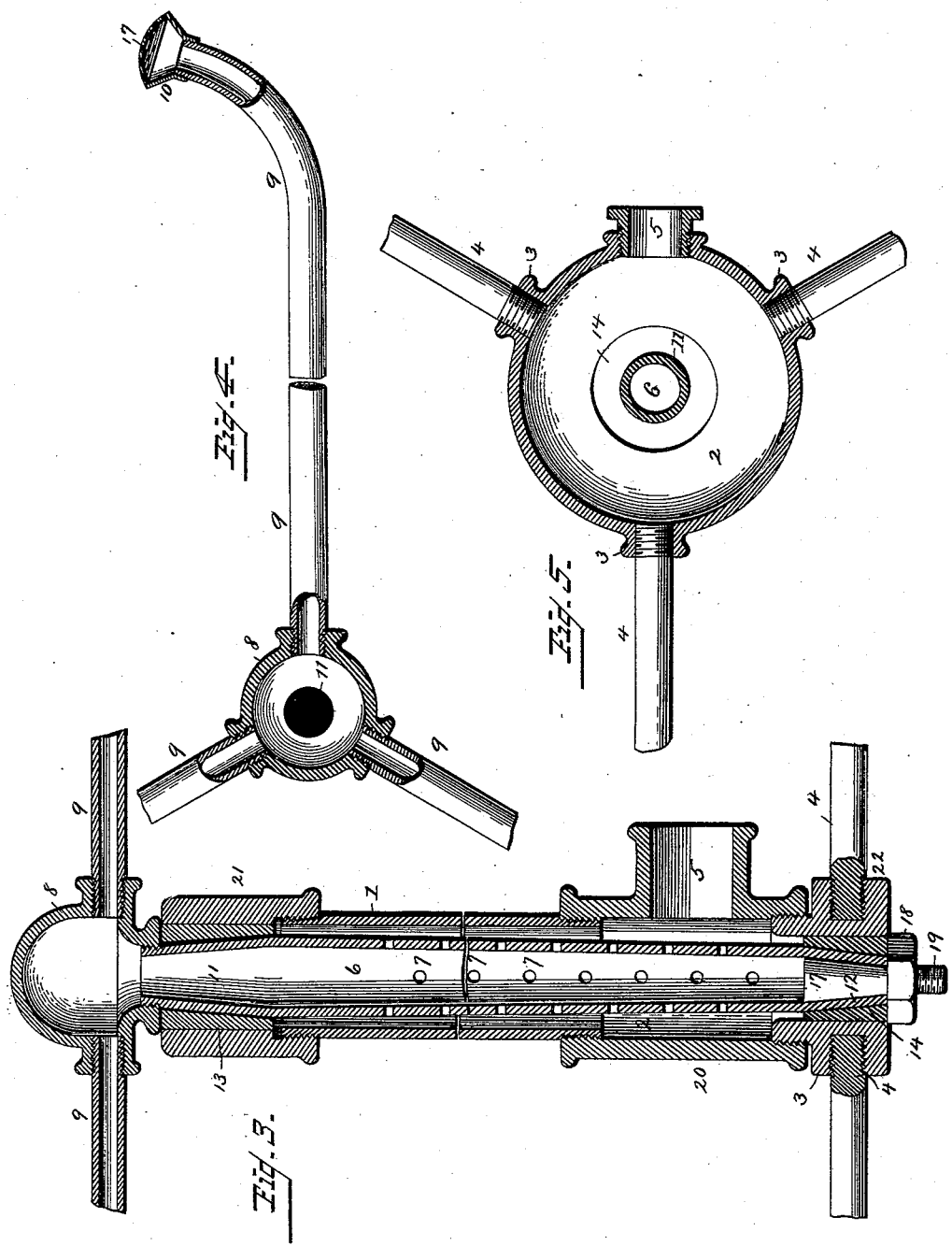

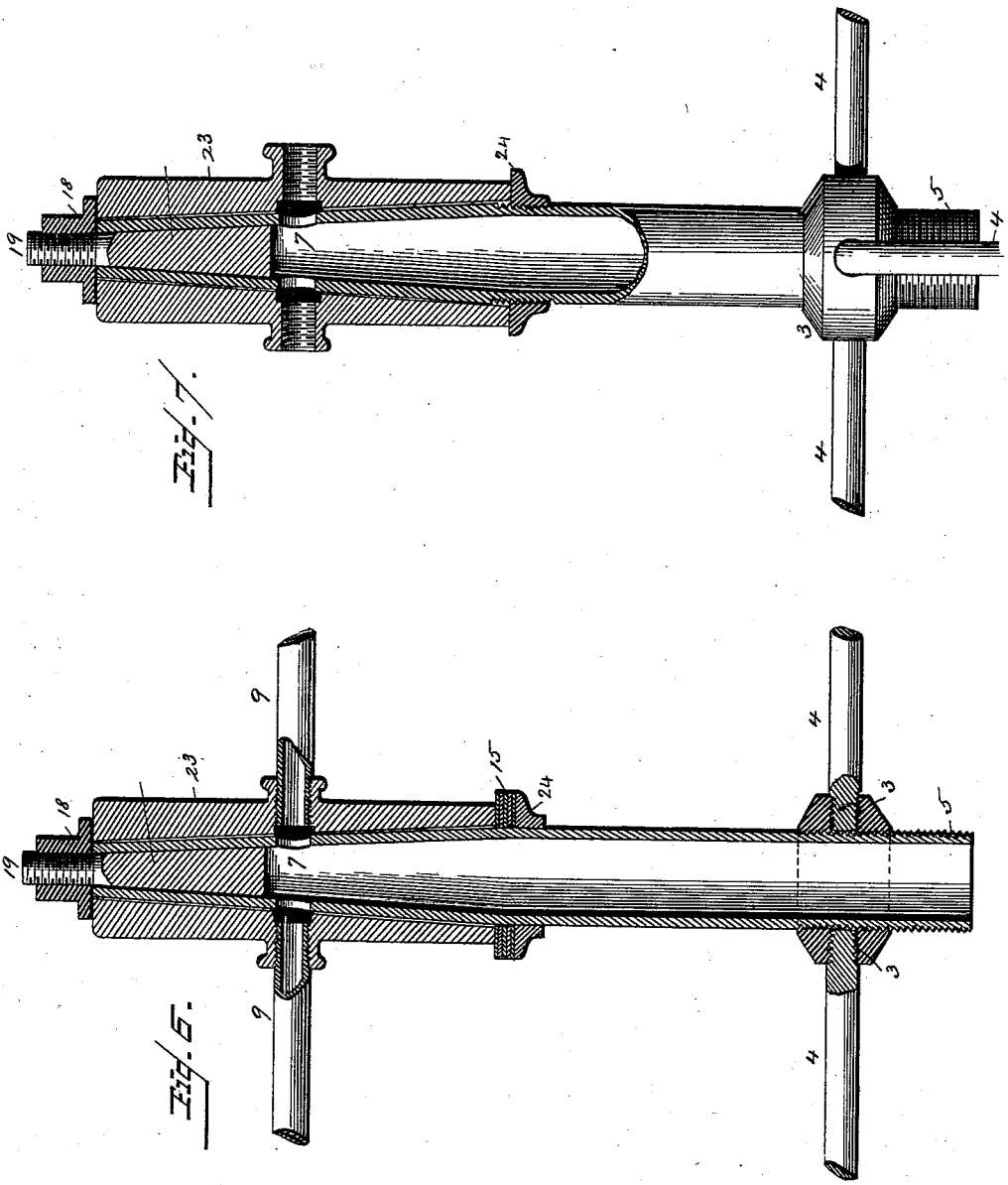

UNITED STATES PATENT OFFICE.

ARTEMAS A. KENT, OF SAN JOSÉ, CALIFORNIA, ASSIGNOR OF ONE-HALF TO JOSIAH J. CHERRIE, OF SAME PLACE.

LAWN-SPRINKLER.

SPECIFICATION forming part of Letters Patent No. 423,778, dated March 18, 1890.

Application filed September 27, 1889. Serial No. 325,301. (No model.)

*To all whom it may concern:*

Be it known that I, ARTEMAS A. KENT, a citizen of the United States, residing at San José, in the county of Santa Clara and State of California, have invented new and useful Improvements in Lawn-Sprinklers, of which the following is a specification.

My invention relates to improvements in lawn-sprinklers, and especially to that class constructed with stand-pipes having a hollow rotating head and perforated arms for distributing the water, and in which said head is connected with the stand-pipe by means of tapering bearings and is operated by the reaction of the water.

The object of my improvement is to provide means for sliding the tapering bearings together to compensate for the wear thereof and to maintain tight joints at the bearings of the fixed and movable parts, and thereby greatly increase the effectiveness and durability of the sprinkler. In attaining this object my invention is equally applicable to rotating sprinkler-heads having both single and dual tapering bearings, as illustrated in the accompanying drawings. In the dual construction the tapering bearings for the rotating sprinkler-head are arranged within the fixed stand-pipe and provision is made at the top and at the bottom of the latter for sliding the tapering bearings together to compensate for the wear thereof, and both bearings are within the water-chamber, so that the pressure of the water thereon is equal upon the said bearings, so that there is no undue vertical draft upon the rotating head.

My invention embraces matters of construction and of combination, which I will particularly point out and designate in the claims concluding this specification.

Referring to the drawings, Figures 1, 2, and 3 represent vertical sections of stand-pipe lawn-sprinklers having dual tapering bearings, in each of which is shown an application of my improvement for compensating the wearing of the joints. Fig. 4 is a horizontal section of the head-cap and sprinkler-arms. Fig. 5 is a horizontal section of the lower chamber and inlet-pipe shown in Fig. 1. Figs. 6 and 7 represent vertical sections of stand-pipe lawn-sprinklers having single tapering bearings, in each of which is shown an application of my improvement for compensating the wear of the joints.

In Figs. 1, 2, and 3 the sprinkler is shown constructed with a revolving pipe 6, having perforations 7, which open into a surrounding space in the stand-pipe 1, and from which the water passes into the revolving pipe to the sprinkler-head, which is provided with the perforated distributing-arms 9. This revolving head-pipe has two bearings 13 and 14, both tapering downward in each end of the stand-pipe.

In Fig. 1 the perforated rotating pipe 6 and its top chambered cap 8 are shown in one piece, with a horizontal shoulder 16 at the base of the cap, from which the top bearing 11 tapers downward, while the lower bearing 12 tapers downward at the end of said pipe, and the perforations 7 are between these bearings. The stand-pipe is shown made in one piece with the lower inlet-chamber 2, which has the inlet-nipple 5, and below this chamber the stand-pipe has an interior bearing 14, corresponding to the lower tapering bearing of the rotating pipe, while the top of the stand-pipe is beneath the shoulder 16 of the chambered head and has an interior bearing 13, which corresponds with the upper tapering bearing of the rotating pipe. In this construction it is between the shoulder 16 of the chambered cap and the upper end of the stand-pipe that the adjusting provision is applied, as a series of washers 15, so that as the joints at the top and at the bottom of the rotating pipe become loosened by wear, so as to cause leakage, one or more of these washers are removed, and thereby allow the tapering bearings of this pipe to slide farther into the bearings of the stand-pipe and become tightened. A tapering screw-plug 17 within the lower end of this rotating pipe serves, by means of a nut 18, screwed up on the lower threaded end of said plug against the end of the stand-pipe, to steady the working of the sprinkler-pipe.

In Fig. 2 I have shown a modification of the provision for adjusting the tapering bearings of the rotating pipe by making the chambered cap 8 a screw attachment to its pipe and screwing it up or down on the stand-pipe, and thereby raise or lower the downward tapering bearing of the rotating sprinkler-pipe in its relation to the downward tapering bearing in the stand-pipe, and thus compensate for the wear. In this construction the lower bearing is made separate from the rotating sprinkler-pipe, so as to admit of separate adjustment to compensate for unequal wear in the upper and lower bearings. For this purpose I make the lower bearing for the rotating pipe in a lower rotating plug 12, which tapers upward in a corresponding bearing in the lower end of the stand-pipe and is adjusted up or down therein on a screw-stem 19, which projects from and has a fixed relation to the lower end of the rotating sprinkler-pipe, so that said plug rotates with the latter, and is held in place by a nut 18 on the screw-stem, and to prevent the revolving pipe from being lifted from its seat by the pressure of the water.

Fig. 3 illustrates the application of the adjusting provision to a sprinkler the stand-pipe for which is made in several sections screwed together and in which the water-supply enters the lower chambered section 20, the upper section 21 forms the upper bearing, and the lower section 22 forms the lower bearing, and in which the said bearings are tapered in opposite directions, the bearings on the ends of the rotating sprinkler-pipe corresponding. To adjust the seats in the revolving sprinkler-head pipe in this construction of stand-pipe, it is only necessary to turn the sections of the stand-pipe and draw the bearings closer together or separate them farther apart, as the case may require.

In Fig. 6 I have shown the provision for sliding the tapering bearings together in a lawn-sprinkler in which the rotating sprinkler-head 23 is made tapering upward from end to end on its inner side and fitted on the correspondingly-tapered upper end of the fixed stand-pipe and rests upon a fixed collar 24 on the stand-pipe, between which and the lower end of the revolving head is placed a series of washers, the removal of which one by one allows the revolving head to slide down on the tapering bearing of the stand-pipe to compensate for the wear at the joint, and thus prevent leakage. In this construction the tapering bearing part of the stand-pipe and the revolving sprinkler-head have coincident openings which communicate directly with the sprinkler-arms screwed to nipples on the head.

In Fig. 6 the collar 24 is screwed upon a threaded portion of the stand-pipe, and is thereby made to adjustably support the revolving sprinkler-head and allow it to slide down upon its tapering bearing to compensate for the wear of the bearings.

Referring to Fig. 1, it will be seen that the upper bearing or seat 13 of the stand-pipe and the upper tapering end 11 of the revolving sprinkler-pipe are larger than the lower bearing or seat in the stand-pipe and the lower tapering end of the revolving sprinkler-pipe, for the purpose of equalizing the pressure of the revolving pipe upon its bearings, inasmuch as the weight of the column of water above the lower bearing would increase the pressure upon said bearing if both bearings were of the same size. It will also be seen that the chambered cap of the revolving sprinkler and the chambered base of the stand-pipe co-operate to increase the pressure of the water within the revolving pipe, and thereby increase the force of the flow from the sprinkler-arms. It will also be seen from the drawings that the bearings of the revolving pipe may be made tapering both in one direction and in opposite directions, and that by providing two bearings for the revolving pipe a true support is thereby given the latter. The water enters the base-chamber through a hose which connects with the nipple 5, and, filling the space within the stand-pipe, passes into the revolving pipe, filling its cap-chamber and escaping through the sprinkler-arms, causing them to revolve by reaction.

I claim as my improvement—

1. In a lawn-sprinkler, the combination, with a stand-pipe, of a revolving perforated pipe within said stand-pipe, having curved sprinkler-arms at its upper end and having bearings in said stand-pipe at its upper and lower ends, substantially as described.

2. In a lawn-sprinkler, the combination, with a stand-pipe, of a revolving perforated pipe within the same, having curved sprinkler-arms at its upper end and having tapering or conical bearings in said stand-pipe at its upper and lower ends, substantially as described.

3. In a lawn-sprinkler, the combination, with a stand-pipe having tapering bearings at its upper and lower ends and provided with an inlet, of a perforated pipe having curved sprinkler-arms at its upper end and having tapered portions seated upon said bearings, and means for adjusting said pipe in relation to said bearings, substantially as described.

4. In a lawn-sprinkler, the combination of a stand-pipe having an inlet, downwardly-tapering bearings in the upper and lower ends of said pipe, a pipe having openings and formed with tapering ends fitting in said bearings, and with a chambered cap at its upper end having curved sprinkler-arms, and washers interposed between said cap and said upper bearing, substantially as described.

5. In a lawn-sprinkler, the combination of a stand-pipe having the annular chamber 2 and nipple 5, the bearings 13 and 14 in the ends of said pipe, the perforated pipe 6, having the tapering parts 11 and 12, and the chambered cap 8, the sprinkler-arms 9, the washers 15, the plug or spindle 17, and the nut 18, substantially as described.

6. In a lawn-sprinkler, the combination, with a stand-pipe, of a revolving perforated pipe within said stand-pipe, having curved sprinkler-arms at its upper end and having a larger upper bearing and a smaller lower bearing in the ends of said stand-pipe, substantially as described.

7. In a lawn-sprinkler, the combination, with a stand-pipe having a larger tapering bearing in its upper end and a smaller tapering bearing in its lower end, of a revolving perforated pipe within said stand-pipe, having sprinkler-arms at its upper end and having tapering parts seated in said bearings, substantially as described.

In testimony whereof I have hereunto set my hand in the presence of two subscribing witnesses.

ARTEMAS A. KENT.

Witnesses:
   B. F. ENTRIKEN,
   E. P. HOUSE.